F. BAKER.
ELECTRIC MOTOR.
APPLICATION FILED OCT. 17, 1912.

1,119,387.

Patented Dec. 1, 1914.

3 SHEETS—SHEET 1.

Witnesses:

Inventor:
Fred Baker,
By L. B. Copland,
Atty.

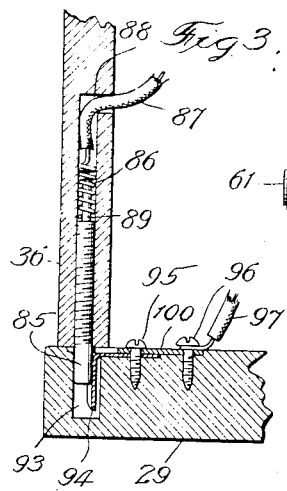
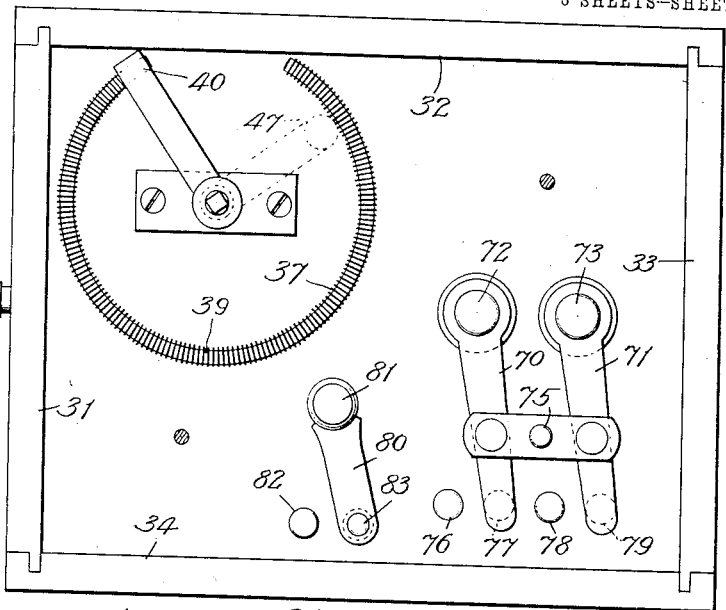
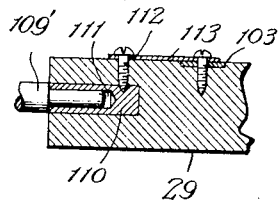
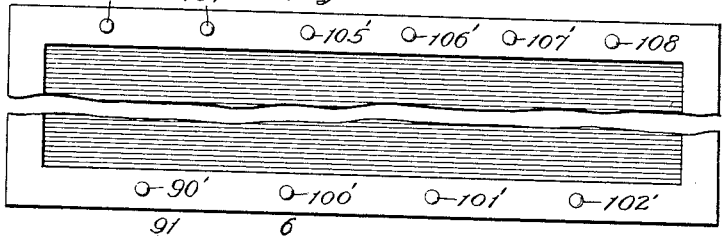
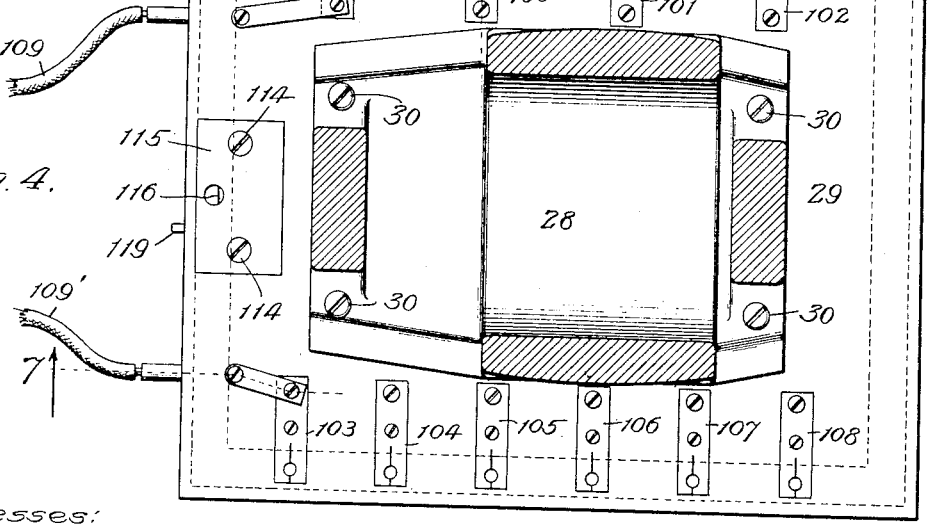

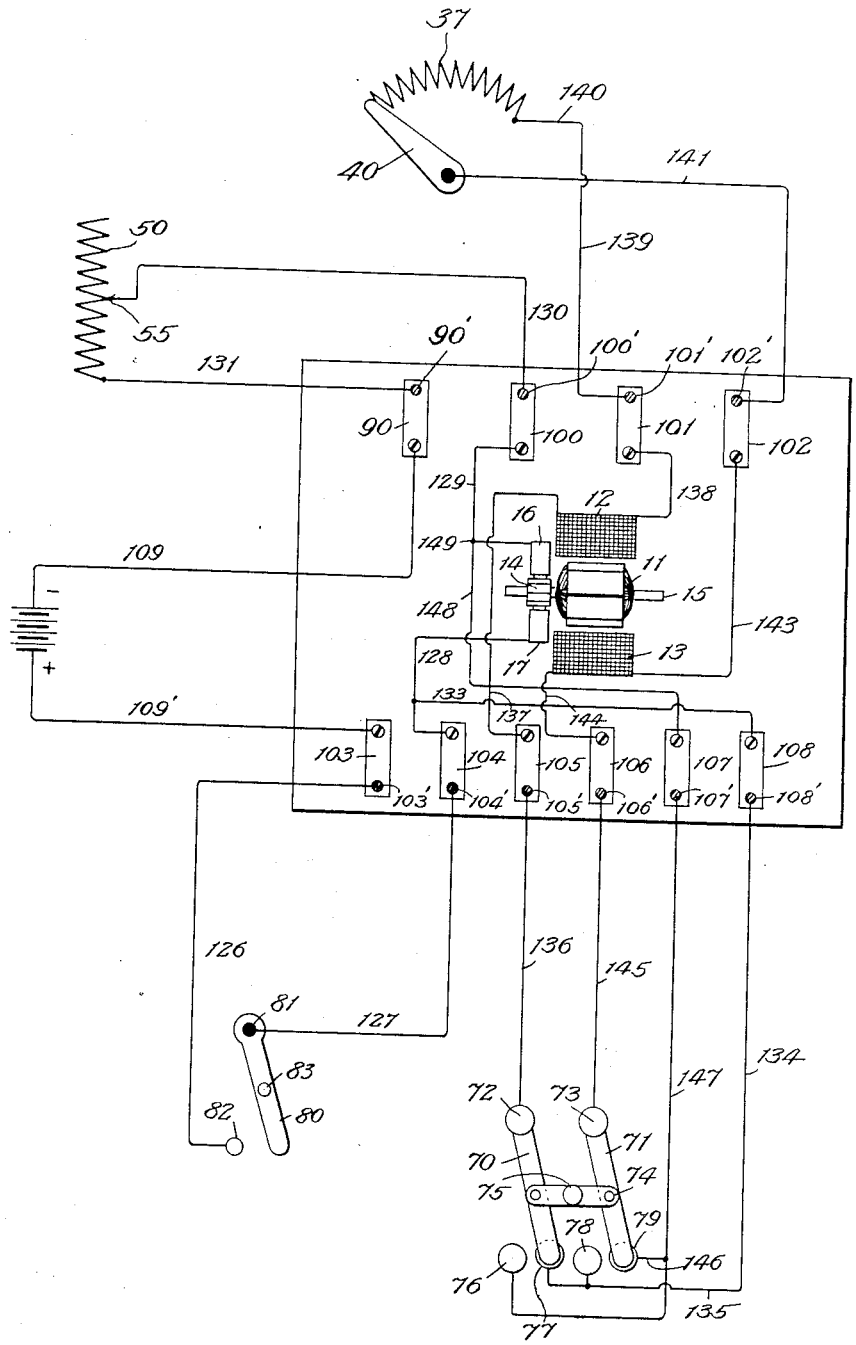

UNITED STATES PATENT OFFICE.

FRED BAKER, OF DOWNERS GROVE, ILLINOIS.

ELECTRIC MOTOR.

1,119,387.   Specification of Letters Patent.   Patented Dec. 1, 1914.

Application filed October 17, 1912. Serial No. 726,226.

*To all whom it may concern:*

Be it known that I, FRED BAKER, a citizen of the United States, residing at Downers Grove, in the county of Dupage and State of Illinois, have invented certain new and useful Improvements in Electric Motors, of which the following is a specification.

My invention relates to improvements in electric motors.

One of the objects of my invention is the provision of an equipment for an electric motor, preferably of small power, wherein is provided regulating apparatus, whereby the velocity of the armature may be maintained at uniform speed throughout variations of loads within its capacity and whereby the direction of rotation may be readily reversed and the speed changed quickly and conveniently from its lowest velocity to its highest velocity within its range of operation.

Another object of my invention is to provide a dust-proof casing for an electric motor of this character which may be readily removed for convenience of observation and inspection of the motor, and which casing or housing carries the regulating means having means for their manual operation projecting to the exterior thereof.

Another object of my invention is to provide separable connections between the removable portion of the casing and in that portion or base, which remains permanently with the motor, whereby the electrical connections will be properly and automatically made upon replacement of the casing.

Other and further objects of my invention will become readily apparent to persons skilled in the art from a consideration of the following description when taken in conjunction with the drawings, wherein—

Figure 1:
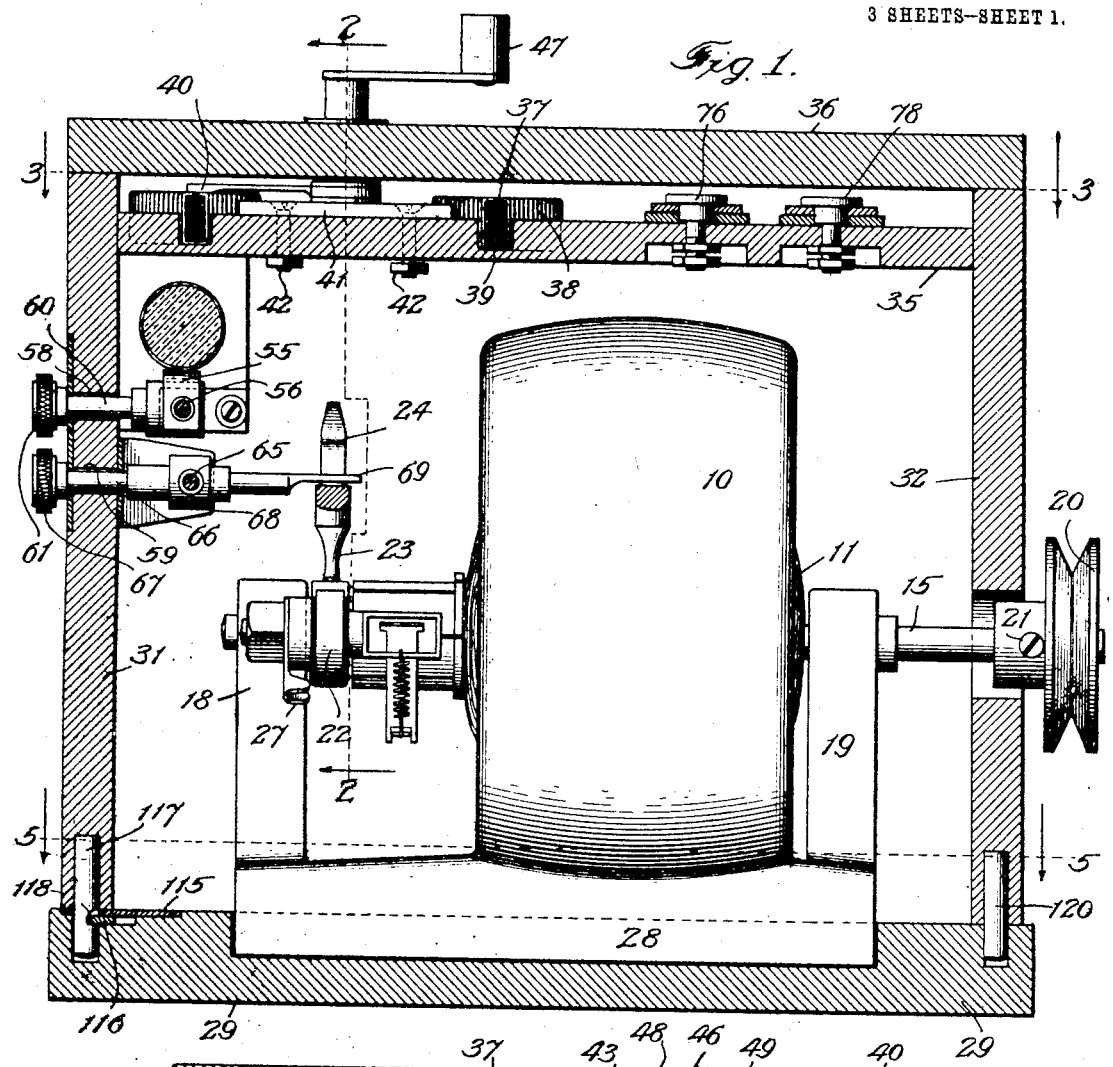
Figure 2:
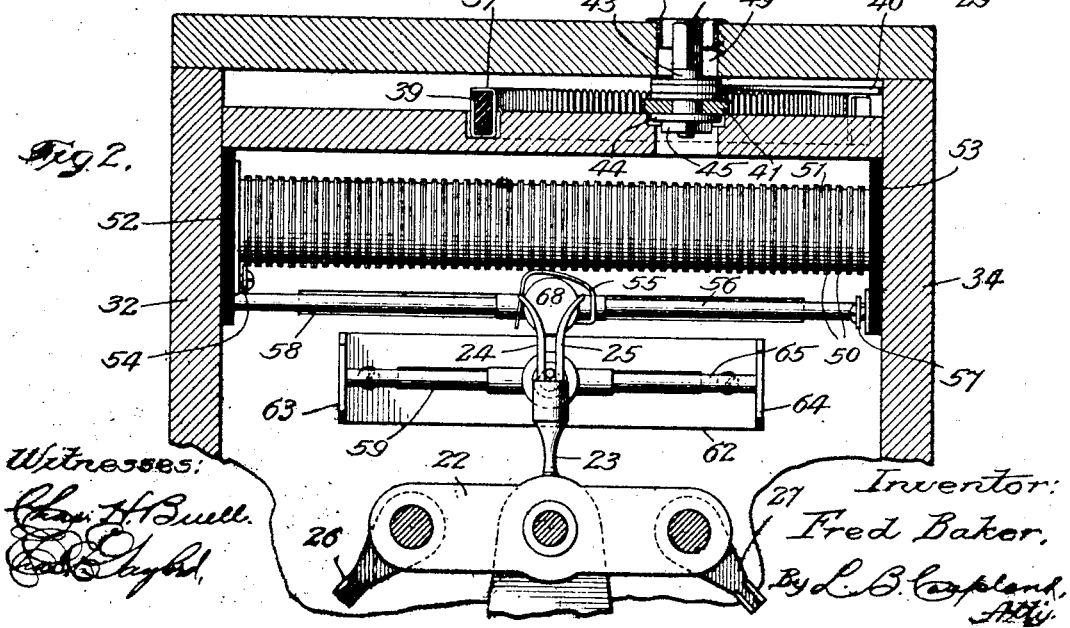

Figure 1 shows an elevation of the motor with the surrounding housing, or casing, in section; Fig. 2 is a transverse section taken on line 2—2 of Fig. 1, showing parts of the regulating means for varying the speed of the said motor when carrying a load; Fig. 3 is a plan view, reduced in size, showing the device with the cover of the casing removed, as shown on line 3—3 of Fig. 1; Fig. 4 is a longitudinal section through the field and frame of the motor showing the base of the casing upon which the motor is permanently mounted; Fig. 5 is a contracted view looking at the open end of the removable portion of the casing; Fig. 6 is an enlarged section taken on lines 6—6 of Fig. 4; Fig. 7 is an enlarged section taken on lines 7—7 of Fig. 4; Fig. 8 is a diagrammatic representation of the circuits, showing a storage battery as a source of electrical energy.

In all the views the same reference character indicates similar parts.

My device is especially adapted for use by silversmiths, watchmakers, dentists, and other artisans requiring small powers that are adapted to be perfectly controlled with reference to their speed and direction of rotation; that are neat and clean in its operation and wherein the motion producing portions and controlling means are housed or protected against contact, and other extraneous influences, while at the same time presenting means for manual manipulation for producing the desired changes of regulation, convenient of access, by the user.

In the exemplification selected to illustrate my invention, 10 is an electric motor, of the shunt, or constant potential type. As usual it is provided with an armature 11 and shunt field windings 12 and 13, having a commutator 14, on the shaft 15, and provided with collecting brushes, 16 and 17, that have bearing upon the commutator. The shaft 15 finds bearings, 18 and 19, in the frame of the electric motor, and a power pulley, 20, is secured to the extended end of the shaft 15. The pulley is removably secured to the shaft by means of a set screw 21. The brush holders are mounted in the yoke 22, which is capable of rotation around the shaft, to a limited extent.

Extending centrally of the yoke 22, is a handle 23, provided at its free end with a fork consisting of prongs 24 and 25 by means of which the yoke 22 may be rotated, within a prescribed limit.

26 and 27 are the terminals of the brush holders. The armature and field circuits are both connected to these terminals.

The frame 28, of the electric motor, is secured to the base 29, of the casing, or housing, which is intended to permanently surround and inclose the electric motor, by means of screws 30.

A removable box-like structure, preferably of wood is composed of four sides 31, 32, 33 and 34, and a false top 35 which is located below and somewhat spaced apart from the upper cover or true top 36. This rectangular structure is adapted to be placed upon the base 29 and to inclose the electric motor.

A variable rheostat 37, for inclusion in the shunt field windings of the electric motor to vary the resistance of the field circuit is mounted upon the false top 35 and consists of a resistance wire 38 wound upon a crescent-shaped support 39, leaving the upper surface of the wire exposed for contact with the rheostatic lever 40. A metal plate 41 is secured to the support 35 by means of screws 42 and by this plate a stud 43 is rotatably supported and held in place by the washer 44 and the nut 45. The rheostat arm 40 is rotatably secured to the stud. The free end of the stud is squared, as at 46, for rotative engagement of the detachable handle 47, whereby the rheostat arm 40 may be rotated. A bushing 48 protects the perforation 49, through which the stud 43 projects, to prevent wear of the wooden portion of the casing. The rotation of the handle 47, as will be clearly understood by persons skilled in the art, serves to include more or less of the resistance of this rheostat in circuit with the field magnet as will be more fully understood when reference is made to diagrammatic view shown in Fig. 8, whereby the speed of the armature will be accelerated above normal.

A rheostat, with some larger conductors, for inclusion in circuit with the armature of the electric motor, consists of the wire 50 wound upon a relatively refractory support 51, is secured to the sides 32 and 34 of the casing by insulated heads 52 and 53 which form a part of the rheostat. A screw 54, forms one terminal of the rheostat. A sliding member 55, supported on the rod 56 forms the other terminal of the rheostat. By moving the contacting member 55 longitudinally of the rheostat winding so as to make electrical connection with the various convolutions thereof, a greater or less amount of the resistance of the said rheostat may be included in series circuit with the armature of the motor, thereby operating as a means for reducing the speed or velocity of the armature of the motor, below normal, when the motor is working under load. The binding screw 57, is the electric terminal for the sliding member 55 and the rod 56.

The side 31, of the casing, is provided with a long slot, 58, and a relatively short slot 59. A metal plate 60 covers the said slots and is provided with slots that register therewith thereby to prevent undue wear of the casing. Projecting through the slot 58, is a stud 60, having on the outside secured thereto a finger button 61. This stud is secured to and is carried by the sliding contact member 55 which, by means of the finger button 61, may be moved along the slot 58, on the rod 56, to the full extent of the length of the rheostatic member, and by this means the operation of the rheostat may be accomplished from the outside of the casing. A metal support 62 carries inwardly projecting brackets, 63 and 64, and is secured to the side 31 of the casing by appropriate screws. It also contains a slot which registers with the slot 59, and secured in the ends of the projecting brackets 63 and 64, is a rod 65. A stud, 66 passes through the slot 59, and is provided on the exterior end with a finger button 67. It is enlarged, as at 68, for sliding engagement with the rod 65, and is reduced in diameter as at 69 to provide a relatively small finger for lying within the fork provided by the prongs 24 and 25, of the brush oscillating moving yoke. Movement of the stud 66 in the slot 59, by means of the finger button 67, serves to rotate the yoke 32 which carries the brushes that bear upon the commutator of the armature and thereby the commutating point of the motor may be varied within a limit appropriate to the proper operation of the armature, and by this means, the speed of the armature may be changed to some extent and proper commutation afforded.

As now described there are three independent means by which the speeds of the motor may be varied to suit the conditions to be met by the operation thereof.

Located on the false top 35 of the casing is a reversing switch whereby the direction of the current, passing through the shunt windings of the field magnet, may be reversed, thereby to change the polarity of the field magnet and to cause the armature to rotate in a reverse direction. This switch consists of switch blades 70 and 71 pivoted, as at 72, and 73, respectively, and loosely connected together by means of a link 74, of insulating material, having secured thereto a handle 75, which is of sufficient length to project through a slot made in the true top or cover 36, of the casing whereby the lateral motion of the reversing switch may be effected from the exterior of the casing. Terminals 76, 77, 78 and 79, coöperate with the blades 70 and 71 for the purpose of reversing the direction of the current through the circuit referred to. The use and operation of this switch will be easily understood by reference to the diagrammatic view shown in Fig. 8.

A circuit closing switch designed to be included in the armature or main circuit consists of the blade 80 pivoted as at 81 and provided with a coöperating contact 82. The free end of the blade is provided with a handle 83 which also projects through a slot in the cover 36 of the casing to provide means for operating this main circuit closing switch from the exterior thereof.

From the drawings and the descriptions so far recited it will be observed that all of the circuit changing and varying devices are located in or mounted on the rectangular removable casing or housing and that all of the circuits lead to the base of the housing. It therefore becomes necessary to provide some means whereby the circuits will be established upon the replacement of the rectangular casing upon the base, I therefore provide in the walls of the removable part, perforations, for accommodation of screw-threaded studs such as, 85 and I provide a spiral coil of several convolutions as 86, upon the conducting wire 87 and pass it through a lateral perforation 88 communicating with the interior of the casing and screw the stud into the casing. The stud has a reduced end 89, which enters the spiral 86, when it is screwed in place thereby completing the electric circuit between the stud 85 and the conducting wire 87. A plate 90 is secured to the base 29 and is provided with a perforation 91 having a communicating slot 92 for yielding and easy accommodation of the stud 85. A vertical perforation 93, somewhat larger than the stud 85, is made in the base 29, and extends nearly to the bottom thereof. A prong 94, made preferably of spring metal, is bent at right angles, one portion of which depends into the perforation 93, for elastic contact with the stud 85, the other portion lying along the upper surface of the base and being perforated for registration with perforations in the plate 90 for attachment by screws 95 to the base 29. The plate 90 is provided with another perforation for screw 96, which latter screw also serves as a binding means for connecting a conducting wire, 23 97 to the plate. Now it is evident that when the vertical side piece, 36 is placed upon the base 29, and the stud 85, register with the perforation 91 and the plate 90, that electric circuit will thereby be completed between the conducting wires 87 and 97. Other similar plates to that indicated by reference character 90, are secured upon the base, at proper intervals, and adapted for the same purpose as that heretofore described, and are indicated by reference characters 100 to 108, inclusive, and corresponding studs adapted for cooperation with the respective plates are indicated by corresponding reference characters with the additional exponent prime (').

Means for connecting the leading wires from the battery, 109 109' are each provided by means of a metallic thimble 110 which is driven into the edge of the base 29. The thimble is provided with a bore 111 for reception of the conductors 109 and 109'. A screw 112 holds the thimble 110, in place, and passes through the link 113 which connects the thimble 110 with the plate 103. The stud connected to the conducting wires 109 and 109' are held in the respective thimbles 110 by frictional engagement.

Referring to Figs. 1 and 4, a plate 115 is secured to the base, by means of screws 114 and is provided with a perforation for insertion of the stud 117. A spring pressed latch 116, is contained under the plate 115, and is adapted for engagement with a shoulder on the stud 117 by means provided by the cut away portion 118. When the casing is placed in position, on the base, and the stud 117 enters the perforation in the plate 115, the spring pressed latch 116 will engage the shoulder 118 and hold the casing firmly in position on the base so that it cannot be removed. A projection 119, communicates with the spring pressed latch. A similar stud or dowel pin 120 is provided at the opposite end of the casing. It is not accompanied with a latch as one latch is sufficient to hold the casing in place.

Now referring to the schematic arrangement of circuits shown in Fig. 8, B is a battery, preferably a storage battery, as a source of electrical energy for the purpose of operating the motor, although current may be supplied by any constant potential source suitable for the purpose.

In starting the motor it is essential first to close the main line switch, consisting of the blade 80 and the contact 82. The circuit will then be as follows:—leaving the positive pole of the battery by wire 109' to the plate 103 and from the stud 103' over the wire 126 to the contact 82, through the switch blade 80, over the wire 127 to stud 104', to the plate 104, over the wire 128, to the brush holder 17, of the dynamo, through the armature of the dynamo and from brush holder 16 to point 149 and over the wire 129 to the plate 100, stud 101' over the wire 130, through the armature resistance, or rheostat 50, at the point 55, showing that only a portion of said resistance in cut in circuit with the armature, over the wire 131, to the stud 90' and plate 90 over the wire 109, back to the negative terminal of the battery, thus completing the circuit through the armature of the motor. The shunt field circuit may be traced as follows:—from the wire 128, over the wire 133, to the plate 108 and stud 108', over the wire 134, wire 135, to the contact point 77, over the blade 70 to the pivotal point 72, then over the wire 136, to the stud 105' and plate 105, and over the wire 137, through the field coil windings 12, over the wire 138 to the plate 101 and stud 101' over the wire 139 to the terminal 140 of the field rheostat, through the entire resistance of the rheostat, to the rheostat arm 40, over the wire 141, to the stud 102' and plate 102, and over the wire 143 through the shunt field windings, 13, over the wire 144 to plate 106 and stud 106', over the wire 146 to contact point 73, over blade 71 to contact point 79, over wire 146 to wire 147, then to stud 107' and plate 107 and over the wire 148 to the contact point 149 by the wire 129, thus completing the circuit through the shunt field windings of the motor, which are in parallel with the armature. Now if the reversing switch consisting of the blades 70 and 71 be shifted from the position shown so that the said blades make electrical connection with the contacts 76 and 78, respectively, the circuit through the field windings will be reversed, in a manner well understood.

The armature of the motor will rotate at substantially constant speed, under varying loads when the current supplied is from a source of constant potential, within the capacity of the motor, when all of the resistance in the armature and the resistance in the field windings is entirely cut out. Now if it is desired to accelerate the speed of the armature, above normal, under the conditions mentioned, it is only necessary to cut into the circuit, with the field winding, a certain portion of the rheostat coil 37 when the increase speed of the armature will be immediately effected. If when the motor is in operation under a load, it is desired to rotate the armature at less than normal speed it is only necessary to cut in some of the resistance of the rheostat, in series with the armature of the motor, when the speed of the armature will be reduced below normal. By the means shown and described great variation of speed and substantial constant regulation under all changes of speed may be effected.

While I have herein described with considerable detail a single embodiment of my invention it is evident that many changes may be made, from the specific structure shown, without departure from the spirit and scope of the appended claims.

What I claim is:

1. An electric motor equipment comprising a casing, consisting of a base upon which the motor is mounted, and a removable box-like inclosing cover having an additional inner top; controlling devices, comprising a field rheostat and a reversing switch mounted on said inner top and included between the inner and outer top, thereby to protect the rheostat and switch, and manually operable means extending from said devices through the outer top to the exterior of the cover and separable contacts on the base and cover respectively for connecting said devices and circuits when the cover is replaced on the base.

2. An electric motor equipment comprising a casing, consisting of a base, upon which the motor is mounted, and a removable box-like inclosing cover; a rheostat, adapted for connection in the armature circuit of the motor, carried in and by said cover; rheostat-operating means extending through the wall of said cover; electrical contacts, carried by said cover, and base, respectively, adapted for registration and electrically coöperating to complete the electric circuits when the cover is placed on the base.

3. An electrical equipment comprising a casing, consisting of a base upon which the electric motor is mounted, a removable box-like inclosing cover; an oscillatable brush-carrying yoke mounted upon the motor frame; a yoke-moving means carried by said yoke; separable, coöperating moving means projecting through the wall of the removable cover for engagement with said yoke-moving means, adapted to be operated from the exterior of the casing, for oscillating said yoke to vary the commutation point of the motor and separable circuit terminal contacts on the base and cover respectively for opening the motor circuit when said cover is removed from the base.

In testimony whereof I affix my signature in presence of two witnesses.

FRED BAKER.

Witnesses:
A. H. STANTON,
J. B. DONALSON.